Oct. 30, 1934.  J. W. KNIPE  1,978,637
CAR TRUCK BOLSTER LOCK
Filed May 11, 1932  2 Sheets-Sheet 2
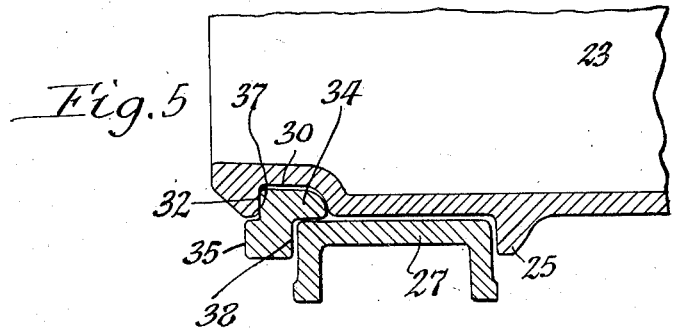
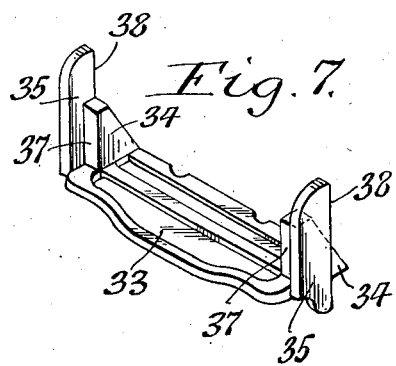
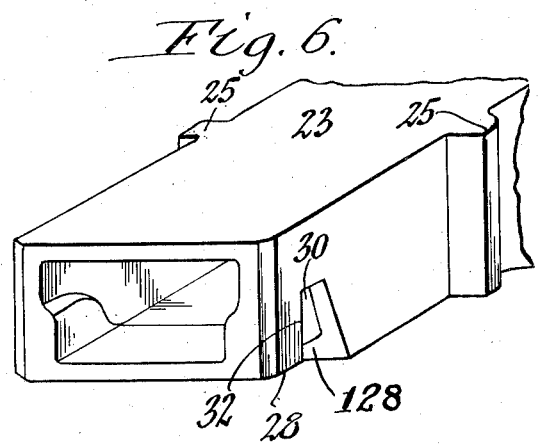
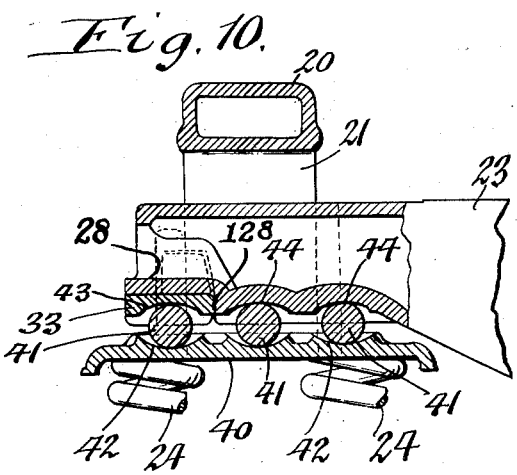
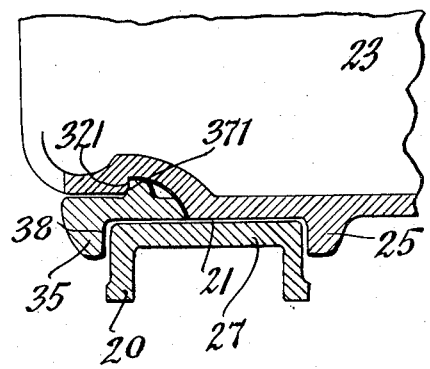
INVENTOR
John W. Knipe
BY Popp & Towers
ATTORNEYS Patented Oct. 30, 1934

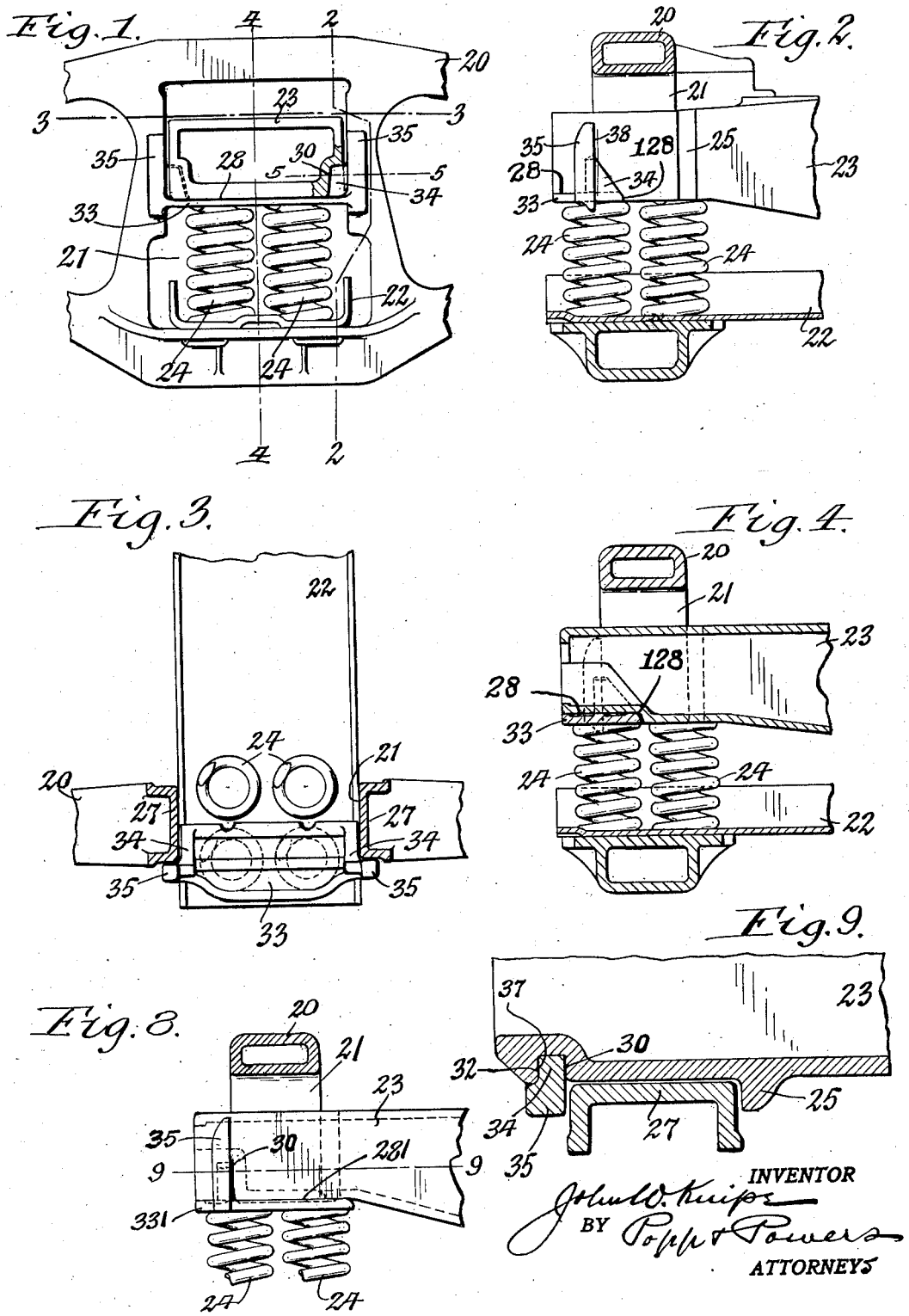

1,978,637

UNITED STATES PATENT OFFICE 1,978,637

CAR TRUCK BOLSTER LOCK

John W. Knipe, Hamilton, Ontario, Canada, assignor to Adirondack Steel Foundries Corporation, Watervliet, N. Y., a corporation of New York Application May 11, 1932, Serial No. 610,611

1 Claim. (Cl. 105—197)

This invention relates to a car truck and more particularly to the means for detachably mounting opposite ends of the bolster of a car truck in the side frames thereof.

The objects of this invention are to provide means for mounting the bolster in the side frames of the car truck without necessitating dropping the bolster for the purpose of disconnecting the same from the side frames, also to interlock the bolster with the side frames by means which present ample bearing area, and also to provide means for interlocking the bolster with the side frames which are comparatively simple in construction, economical to manufacture, and provide a very durable and reliable connection between the bolster and the side frames and also permit of using standard side frames which are now in general use.

In the accompanying drawings:—

Figure 1 is a fragmentary side view of a car truck side frame showing one end of a bolster mounted therein by the means embodying one form of this invention.

Figure 2 is a vertical longitudinal section thereof taken on line 2—2 Fig. 1.

Figure 3 is a horizontal section taken on line 3—3 Fig. 1 looking downwardly with the bolster removed.

Figure 4 is a vertical longitudinal section taken on line 4—4 Fig. 1.

Figure 5 is a fragmentary horizontal section, on an enlarged scale, taken on line 5—5 Fig. 1.

Figure 6 is a fragmentary perspective view of one end of the bolster constructed in accordance with one form of my invention.

Figure 7 is a perspective view of the locking member shown in Figs. 1 to 5.

Figure 8 is a fragmentary vertical longitudinal section similar to Fig. 2 showing a modified form of this invention.

Figure 9 is a fragmentary horizontal section, on an enlarged scale, taken on line 9—9 Fig. 8.

Figure 10 is a fragmentary vertical longitudinal section similar to Fig. 4 showing another modified form of this invention.

Figure 11 is a fragmentary horizontal section, similar to Figs. 5 and 9, showing another modified form of this invention.

In the following description similar characters of reference indicate like parts in the several figures of the drawings.

Referring to Figs. 1 to 7, the numeral 20 represents one of the side frames of the car truck which is provided centrally with a window or opening 21 in which are mounted the means whereby the two side frames of a truck are operatively connected with each other and the weight of the car body is yieldingly supported on these side frames.

Arranged within the lower part of this window and resting on the lower end or bottom thereof is one end of a spring plank 22, which latter is preferably made in the form of a channel iron with its concave side facing upwardly.

Arranged within the upper part of the window of the side frame is one end of a bolster 23 of metal. Between the underside of each end of the bolster and the upper side of the corresponding end of the spring plank 22 is arranged spring means for yieldingly supporting this bolster on the spring plank and car truck, which spring means in the present case consist of a plurality of helical springs 24.

The present invention relates more particularly to the means for mounting each end of the bolster in one of the side frames so that this bolster may be readily coupled with the side frame or detached therefrom and also be free to move vertically on the side frame for yieldingly supporting the load which is imposed upon the bolster. The means for thus mounting one end of the bolster in one of the side frames, which are shown in Figs. 1 to 7, are constructed as follows:—

If desired the opposite outer sides of the bolster are provided with lugs 25 engaging with the inner vertical sides of the upright columns 27 which form the opposite vertical sides of the window or opening in the adjacent side frame of the car truck. On its opposite vertical outer sides the bolster is provided adjacent to its outer end with upright recesses or notches 30 and each of these side recesses is provided with an outer upright inwardly facing shoulder 32.

Means are provided for preventing the bolster from being withdrawn inwardly from the opening in the side frame and still enable this bolster to move vertically relatively to the side frame. These means consist generally of a lower transverse coupling bar or plate 33 which is arranged horizontally underneath the outer end of the bolster, and two upright locking keys or lugs projecting upwardly from opposite ends of the locking bar 33 and engaging respectively with the upright recess 30 on opposite vertical sides of the bolster. Each of these locking keys is provided with an inner section 34 and an outer section 35, these two sections of each key lug being formed integrally with each other and with the locking bar 33. The inner section 34 of each key lug is provided with an upright front or outer face 37 which engages with the upright inwardly facing shoulder 32 of the recess 30, and the outer section 35 of each key lug has an upright shoulder 38 which faces inwardly and engages with the adjacent upright outer side of the adjacent column of the side frame and thereby prevents the bolster from being moved longitudinally inward relative to the side frame so as to prevent these parts, while in operation, from becoming disengaged but still permitting the bolster to rise and fall within the window of the side frame.

The locking member is held in its operative position with reference to the bolster and side frame by engaging the upper ends of the springs 24 with the underside of the transverse bar or plate 33, as best shown in Fig. 4, so that these springs not only hold the locking member in position on the bolster but also indirectly form a yielding support for the latter.

When it is desired to remove the side frames from the bolster for the purpose of inspecting or repairing the car truck it is only necessary to lift or jack up the respective end of the bolster to the upper part of the window in the side frame a sufficient distance to disengage its side notches or recesses 30 from the upright key lugs of the locking member, after which the latter can be removed outwardly from between the bolster and the upper ends of the springs, and then the respective side frame and bolster can be separated by moving the side frame horizontally outward or moving the bolster horizontally inward from the window of the side frames without necessitating removing the spring system and dropping the bolster into the lower part of the window before it is possible to disconnect the same as has been the case heretofore.

Re-assembling of the side frame and bolster can be effected by reversing the operation just described.

These operations can be performed much more conveniently and quickly and also without any idle motions as has been necessary in certain types of car trucks heretofore in use.

Moreover this improved locking device is very sturdy and not liable to get out of order but instead holds the side frame and the respective end of the bolster in proper operative relation to each other and at the same time permits free vertical movement of the same relatively to each other as the spring support within the window of the side frame is expanded and contracted under variations in the load imposed on the bolster.

It is possible to thus uncouple the bolster from the side frame by merely lifting the end of the bolster sufficiently high to release the locking device due to the fact that the inwardly facing shoulders 32 on the outer part of the bolster are arranged within the space delimited by the width of the window opening in the side frame and also preferably by arranging these shoulders 32 so that they are within the peripheral, dimensional or boundary lines of that part of the bolster which is located within the window opening of the side frame. Heretofore rigid outer stops, lugs or shoulders have been employed on the outer ends of the bolster which projected laterally beyond the outer side of the bolster and therefore necessitated first removing the spring system from the lower part of the window and then dropping the end of the bolster into the lower part of the window in order to permit the laterally projecting outer lugs of the bolster to pass through notches or enlargements in the lower part of the window opening for disassembling the same.

In the construction shown in Figs. 1 to 7 the inwardly facing upright stop shoulders 32 on opposite vertical sides of the bolster are arranged on the outer side of the car frame. If desired, however, a similar shoulder 321 for performing the same function may be arranged on each upright side of the bolster 23 on a line which is arranged within the window of the side frame 20 and each upright key lug of the locking member may be provided with an upright outwardly facing shoulder 371 which engages with said inwardly facing outer shoulder, as shown in Fig. 11.

In the construction shown in Figs. 1-4 the transverse plate 33 of the coupling member is narrow and engaged by only some of the total number of the springs 24 while the remainder bear directly against the underside of the bolster.

Figs. 2 and 4 also represent a bolster provided on the underside with a transverse horizontal recess 28 which extends from the end of the bolster inwardly and forms an outwardly facing shoulder 128 between the shallow outer part of the bolster and deep inner part thereof, which recess receives the bar 33 so that the underside of the latter is flush with the underside of the deep inner part of the bolster, and the inner end of the bar 33 engages with the shoulder 128, as shown in these figures. The lower ends of the vertical recesses forming the faces 32, 30, 37 on opposite sides of the bolster extend upwardly from opposite ends of the horizontal recess 28, as shown in Figs. 1 and 4.

In the construction shown in Fig. 8 the transverse bar or plate 331 is sufficiently wide so that it extends rearwardly underneath the outer part of the bolster 23 to such an extent that it is engaged on its underside by all the cushioning springs 24.

If desired, a rolling support may be provided between each end of the bolster 23 and the upper end of the spring suspension means, which rolling support is constructed to permit a limited longitudinal movement of the bolster within the window of the side frame and may consist generally of a spring supporting plate 40 resting on top of the springs 24, and a plurality of rolling members 41, all of which engage with concave seats or recesses 42 in the upper side of the spring plate 40, while the upper side of the outermost rolling member 41 engages with the concave seat or recess 43 on the underside of the cross bar 33 of the locking member and the intermediate and inner rolling members engage with concave seats or recesses 44 on the underside of the adjacent part of the bolster, as shown in Fig. 10.

All of the several forms of this invention are comparatively simple in construction and capable of being produced at low cost and when assembled with other parts of a car truck in the manner described form a connection between the bolster and the side frames which is strong and reliable and permits the parts of the truck to be easily and quickly assembled and disassembled.

I claim as my invention:

A car truck including a side frame having a window, spring means resting at its lower end on the bottom of said window, a bolster having its end normally arranged in said window and resting with its underside on said spring means and movable lengthwise into and out of said window for assembling and dismembering the truck and also movable vertically in said window while in use, and provided on its opposite vertical sides with vertical recesses, each of which opens downwardly and laterally outward but terminates at its upper end short of the top of the bolster and forms a closure at the upper end of each recess, and a locking member comprising a horizontal bar arranged transversely between the underside of the bolster and the upper end of said spring means, and upright arms arranged at opposite ends of said bar and each of said arms having a relatively short inner section which engages with the recess in the respective side of the bolster and a relatively high outer section arranged along the side of the bolster and extending above said short section and arranged along the upper part of the bolster, and engaging its longitudinal inner side with the outer side of the frame, and said inner section of each arm tapering upwardly so that it is comparatively narrow at the top and wide at the bottom where said arm joins said horizontal bar and engaging with the adjacent vertical transverse side of the window.

JOHN W. KNIPE.